(12) United States Patent
Jaldelid et al.

(10) Patent No.: US 11,046,171 B2
(45) Date of Patent: Jun. 29, 2021

(54) AIR GUIDE SEAL ARRANGEMENT

(71) Applicant: Volvo Car Corporation, Gothenburg (SE)

(72) Inventors: Michael Lönn Jaldelid, Älvangen (SE); Mikael Torgilsson, Gothenburg (SE)

(73) Assignee: Volvo Car Corporation, Göteborg (SE)

( * ) Notice: Subject to any disclaimer, the term of this patent is extended or adjusted under 35 U.S.C. 154(b) by 86 days.

(21) Appl. No.: 16/406,081

(22) Filed: May 8, 2019

(65) Prior Publication Data

US 2019/0375289 A1 Dec. 12, 2019

(30) Foreign Application Priority Data

Jun. 11, 2018 (EP) ..................................... 18177061

(51) Int. Cl.
    *B60K 11/08*     (2006.01)
    *B60R 19/48*     (2006.01)

(52) U.S. Cl.
    CPC .............. *B60K 11/08* (2013.01); *B60R 19/48* (2013.01); *B60R 2019/486* (2013.01)

(58) Field of Classification Search
    CPC ... B60K 11/08; B60R 19/48; B60R 2019/486; B60R 2019/527; F16L 25/0018; B62D 65/06; B60H 2001/00635
    See application file for complete search history.

(56) References Cited

U.S. PATENT DOCUMENTS

| | | | | |
|---|---|---|---|---|
| 5,934,710 | A * | 8/1999 | Le Foll ................... | F16L 37/04 285/39 |
| 6,356,723 | B1 * | 3/2002 | Sato ................... | G03G 15/0817 399/103 |
| 8,371,407 | B2 * | 2/2013 | Hassdenteufel ....... | B60K 11/04 180/68.4 |

(Continued)

FOREIGN PATENT DOCUMENTS

| | | |
|---|---|---|
| DE | 102009056508 A1 | 6/2011 |
| EP | 2481620 A2 | 8/2012 |

(Continued)

OTHER PUBLICATIONS

Nov. 28, 2018 European Search Report issue on International Application No. EP18177061.1.

*Primary Examiner* — Vivek K Shirsat
(74) *Attorney, Agent, or Firm* — Clements Bernard Walker; Christopher L. Bernard

(57) ABSTRACT

An air guide seal arrangement adapted to be located between a bumper fascia and a cooler of a vehicle. The air guide seal arrangement includes a first member and a second member. The first member has a first irregularly shaped edge portion, shaped to seal against an inner surface of the bumper fascia, and a second regularly shaped edge portion being located opposite to the first edge portion. The second member has a first regularly shaped edge portion and a second edge portion, being located opposite to the first edge portion, shaped to seal against a forwards-facing surface of the cooler. At least one of the first member and the second member is resilient. The first member and the second member form two separate members adapted to be held together solely by being pressed together in use.

20 Claims, 11 Drawing Sheets

(56) References Cited

U.S. PATENT DOCUMENTS

| | | | | |
|---|---|---|---|---|
| 9,644,525 | B2* | 5/2017 | Bignon | B60K 11/08 |
| 10,688,862 | B2* | 6/2020 | Jaldelid | B60K 11/085 |
| 2011/0000728 | A1* | 1/2011 | Mildner | B60K 11/08 |
| | | | | 180/68.1 |
| 2011/0084455 | A1* | 4/2011 | Elwell | B01D 65/003 |
| | | | | 277/312 |
| 2015/0068825 | A1* | 3/2015 | Berthevas | B60K 11/08 |
| | | | | 180/68.1 |
| 2016/0131020 | A1* | 5/2016 | Bui | B60K 11/08 |
| | | | | 180/68.1 |
| 2017/0043659 | A1* | 2/2017 | Vacca | B60K 11/08 |
| 2017/0246949 | A1* | 8/2017 | Roussel | B60K 11/08 |
| 2018/0345784 | A1* | 12/2018 | Hammer | B60K 11/08 |
| 2019/0061515 | A1* | 2/2019 | Jeong | B60K 11/08 |
| 2019/0241061 | A1* | 8/2019 | Ross | B60K 11/08 |

FOREIGN PATENT DOCUMENTS

| | | |
|---|---|---|
| EP | 2945814 B1 | 9/2016 |
| FR | 2974037 A1 | 10/2012 |
| JP | 2006205961 A | 8/2006 |
| JP | 2009184487 A | 8/2009 |
| WO | 2004087487 A1 | 10/2004 |

* cited by examiner

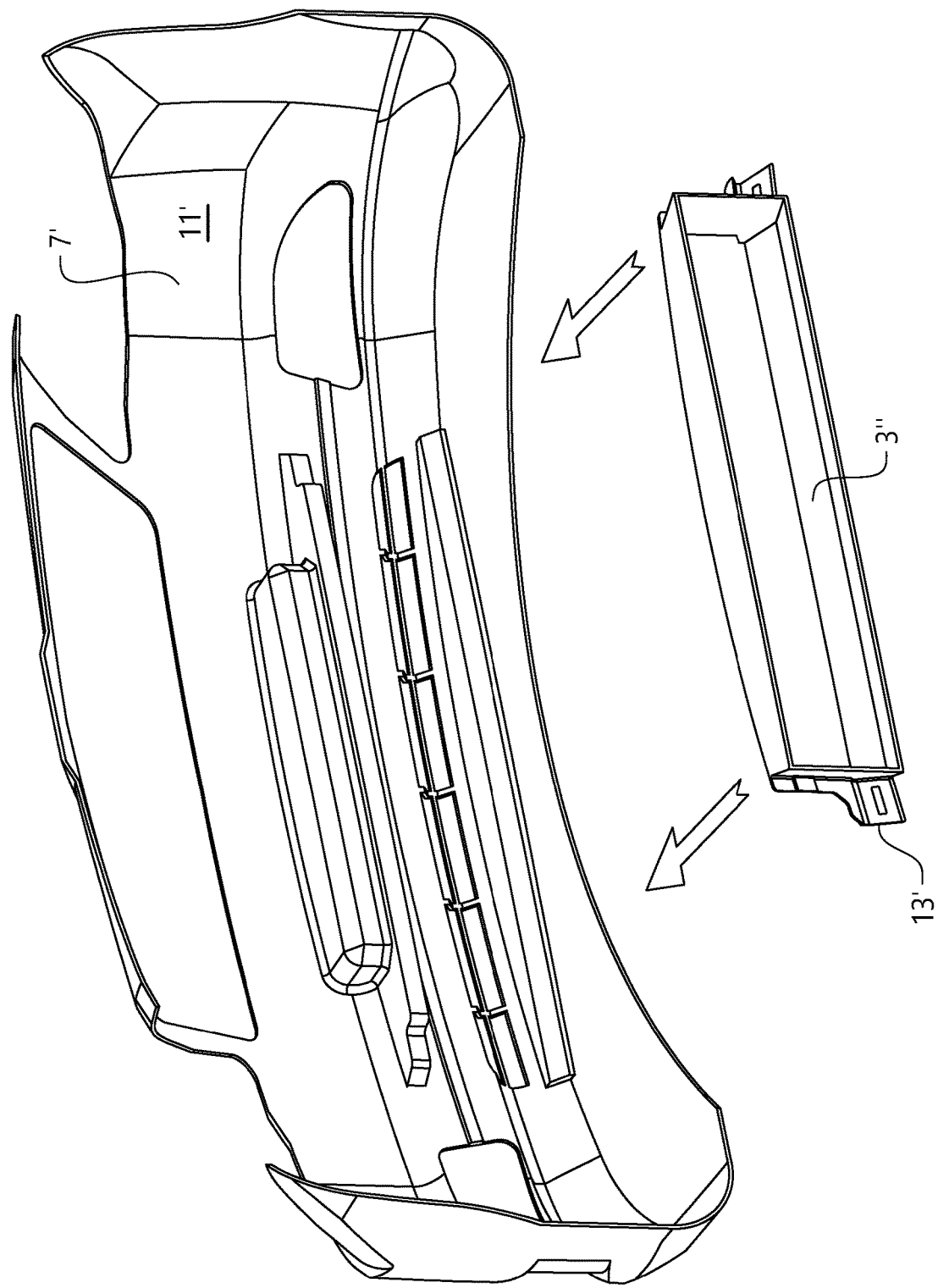

AIR GUIDE SEAL ARRANGEMENT

CROSS-REFERENCE TO RELATED APPLICATION

The present disclosure claims the benefit of priority of co-pending European Patent Application No. 18177061.1, filed on Jun. 11, 2018, and entitled "AIR GUIDE SEAL ARRANGEMENT," the contents of which are incorporated in full by reference herein for all purposes.

TECHNICAL FIELD

The present disclosure relates to an air guide seal arrangement adapted to be located between a bumper fascia and a cooler of a vehicle and including a first member and a second member. The disclosure further relates to a first kit including the bumper fascia and the first member, to a second kit including the cooler and the second member, to a front portion of a vehicle including the bumper fascia, the cooler and the air guide seal arrangement and to a vehicle including the front portion. Moreover, the disclosure also relates to a method of assembling the front portion.

BACKGROUND

In many vehicles, a cooler for the engine is located behind a bumper fascia at a front portion of the vehicle. The bumper fascia has an outer surface, facing outwards towards the surroundings of the vehicle, and an inner surface, facing the cooler, which typically is located in an engine compartment of the vehicle. In order to cool the engine, the cooler is supplied with ambient air, which enters through one or more openings in the bumper fascia. The air may thereafter be guided towards the cooler by means of an air guide seal arrangement. It is then desirable to minimize, or preferably avoid, loss of air, i.e. air leaking out of the air guide seal arrangement.

Patent document EP 2945814 B1 discloses an air guide seal arrangement, which helps to prevent lateral air leaks between a guide for the air of the cooling system and the recess of the front-end cross member of the chassis of a vehicle. The air guide seal arrangement consists of a first portion and a second portion hingedly connected by a substantially sealed hinge. The first portion includes a curved edge which fits into the recess of the cross member. The hinge includes means for locking the second portion in various positions relative to the first portion, including at least one position extending substantially away from the first portion and a folded position substantially perpendicular to the extended position.

However, there is still a desire to provide an improved air guide seal arrangement, which minimizes, or preferably avoids, loss of air, and which yet is easy and quick to mount in the vehicle during assembly of the front portion.

SUMMARY

The object of the present disclosure is to overcome or ameliorate at least one of the disadvantages of the prior art, or to provide a useful alternative.

The present invention relates to an air guide seal arrangement adapted to be located between a bumper fascia and a cooler of a vehicle. The bumper fascia has an outer surface and an inner surface, the inner surface facing the cooler when mounted in the vehicle. The air guide seal arrangement includes a first member and a second member. The first member has a first irregularly shaped edge portion shaped to seal against the inner surface of the bumper fascia, and a second regularly shaped edge portion being located opposite to the first edge portion. The second member has a first regularly shaped edge portion and a second edge portion, being located opposite to the first edge portion, shaped to seal against a forwards-facing surface of the cooler. At least one of the first member and the second member is resilient. The first member and the second member form two separate members adapted to be held together solely by being pressed together in use. The second edge portion of the first member and/or the first edge portion of the second member are shaped to thereby form a seal between the first member and the second member by means of the resiliency.

An edge portion is a portion of the first and second member, respectively, which is adapted to abut another component, in this case the other member, the bumper fascia or the cooler. The first and second edge portions are located opposite to each other, this will be as seen in a longitudinal direction of the vehicle, when the first or second member is mounted in the vehicle.

The irregularly shaped first edge profile of the first member is shaped such that it can seal tightly against the inner surface of the bumper fascia. It thus follows the geometry of that inner surface, which typically is irregular, e.g. being curved and/or having protrusions and/or indentations. Such an irregular surface is in general different to seal against, but thanks to the shaped first edge profile a desired tight seal is possible to obtain.

The irregularly shaped second edge profile of the second member, is shaped such that it can seal tightly against the forwards-facing surface of the cooler. It thus follows the geometry of that forwards-facing surface.

The regularly shaped edge profile of the first and/or second member, respectively, is typically planar, preferably straight, but may also have any other geometry being able to give a tight seal against the other regularly shaped edge profile. Thereby, the regularly shaped edge profiles of the first and second members are adapted to each other, such that they are able to together provide the desired tight seal. They may for instance seal by partly overlapping each other, e.g. overlapping by at least 0.2 cm, at least 0.5 cm or at least 1 cm.

At least one of the first member and the second member is resilient, possibly both. The resiliency may be provided by the shape of the edge portions of the first member and/or the second member or by the shape of the first member and/or the second member as a whole. As an alternative or a complement, the resiliency may be provided by the material properties of the edge portions of the first member and/or the second member or by the material properties of the first member and/or the second member as a whole.

The first member and the second member form two separate members, i.e. they are not attached to each other by any connection means such as a hinge, a snap-fit connection or by any attachment means, such as an adhesive, a rivet or a bolt. Instead, the first member and the second member are adapted to be held together solely by being pressed together when mounted in the vehicle. When pressed together, the second edge portion of the first member and/or the first edge portion of the second member form a seal between the first member and the second member by means of the resiliency.

By utilizing the air guide seal arrangement according to the invention, it is possible to provide regular surfaces suitable for tight sealing, e.g. planar surfaces. According to the invention, the surfaces are provided at the abutment of the first and second members. Thereby, the first member can compensate for an uneven inner surface of the bumper fascia and instead provide a first regular surface suitable for the seal. Correspondingly, the second member can compensate for an irregular surface of the cooler and provide a second regular surface suitable for the seal. As a further consequence, this helps to offer a larger freedom when selecting what bumper fascia to use, since the first member may be used to adapt to different geometries of bumper fasciae, e.g. in a modular system as described below.

Moreover, air guide seal arrangements according to the invention may be provided as a modular system, wherein a plurality of different variants of the first member can fit together with a single variant of the second member. Accordingly, when changing the bumper fascia to another kind, only the first member will be exchanged, while it is possible to continue using the same kind of second member and the same kind of cooler. This is not only work-saving, but also beneficial from a financial point of view, since the first member of the air guide seal arrangement according to the invention usually is less expensive to manufacture than the more complicated second member. This is also financially beneficial when compared to some prior art air guide seal arrangements, in which there only is a single component instead of the combination of the first members and the second member as described herein, since, in that case, that single component has to be exchanged when changing the kind of bumper fascia.

Further, the air guide seal arrangement according to the invention is easy and quick to mount in the vehicle during assembly of the front portion of the vehicle, as is further described below.

Two first members may be attached to the bumper fascia at a respective position corresponding to each lateral side of the cooler, when assembled in the vehicle. The two first members may then be mirror images of each other, e.g. if the bumper fascia is mirror symmetric, or they may have different shapes. As an alternative, only one first member may be used at one of the lateral sides of the cooler. As yet an alternative, the first member may have a size corresponding to the size of a portion of the cooler, to which air is to be guided, e.g. a lower portion of the cooler. In that case, the first member may form a closed circumference, which may have a width corresponding to that of the cooler, as seen in the lateral direction of the vehicle. As yet further alternatives, the first member may have a U-shape, i.e. corresponding to three sides of the portion of the cooler or an L-shape, i.e. corresponding to two sides of the portion of the cooler. Two L-shapes may then be combined.

The second edge portion may have any of the shapes mentioned above for the first member. The second member may for example form a closed circumference in contact with the cooler, e.g. the portion of the cooler, to which air is to be guided. It is thereby possible that both the first member and the second member form closed circumferences. The configurations of the first member and the second member are adapted to each other to give the desired tight seal. However, the configuration of the first member may differ from the second member. Purely as an example, there may be two first members, one at each lateral side and a single second member with a closed circumference.

As mentioned above, at least one of the second edge portion of the first member and the first edge portion of the second member may have a straight shape. The straight shape helps to provide a tight seal by forming the above-mentioned regular surface suitable for sealing. Typically, the straight shape extends substantially in a vertical direction and/or lateral direction of the vehicle, when the first or second member is mounted in the vehicle. Hence, the regular surfaces will form a sealing plane extending in the lateral and vertical directions of the vehicle. Thereby the edge portions of the first and second member, respectively, extend substantially the size of the portion of the cooler, e.g. a lower portion, to which air is to be guided, as seen in the vertical direction and/or lateral direction of the vehicle.

At least 70%, more preferably at least 90%, more preferably at least 95% and more preferably 100% of the first member may include a first material, which may be plastics, preferably injection moulded plastics. A first member of such a material may easily be shaped to fit against the inner surface of the bumper fascia during the manufacturing process of the first member.

The second member may include a resilient lip, the first edge portion with its regular shape being included in the resilient lip. The resilient lip is arranged such that it will abut the first member. The resilient lip is preferably made of a thermoplastic elastomer or rubber. Such materials are known to have resilient properties suitable for sealing. The resilient lip helps to provide a tight seal. The remaining portion of the second member, including the edge portion abutting the cooler, may include another material, typically plastics, e.g. injection moulded plastics.

If selecting the above materials for the first and second members, the resilient lip will help to provide the resiliency used to obtain the seal. If both the first and second members were made entirely of e.g. injection moulded plastics, there could be a risk that the air guide seal arrangement would be too rigid and thus risk to damage the cooler, when pressing the first and second member together during assembly of the front portion. However, by utilizing the above-mentioned resilient lip, this risk is minimized and preferably avoided.

Moreover, if making both members entirely of e.g. injection moulded plastics, the seal could risk being less tight than if providing the resilient lip. There could also be a problem with tolerances when mounting the air guide seal arrangement in the vehicle. There may also be a problem if there is internal displacement between the cooler and the bumper fascia, which preferably is taken up by the air guide seal arrangement.

As a complement or an alternative to the second member including a resilient lip, also the first member may include a resilient lip.

The first member may extend in three extension directions, a first extension direction corresponding to a longitudinal direction of the vehicle, a second extension direction corresponding to a lateral direction of the vehicle, a third extension direction corresponding to a vertical direction of the vehicle, the extension directions being perpendicular to each other. The directions of the vehicle is given assuming the first member forms part of an air guide seal arrangement according to the invention mounted in the vehicle.

Optionally, the first member has an extension in the second extension direction being at least 1 cm, preferably at least 3 cm, more preferably at least 5 cm. This differs from some prior art air guide seal arrangements, which substantially only extends in the longitudinal and vertical directions of the vehicle, i.e. having a second extension being less than 1 cm. This helps to provide good sealing to the bumper fascia in the lateral direction of the vehicle. It also offers a larger freedom when selecting what bumper fascia to use.

In the first extension direction, the first member has an extension which is large enough to provide the above-mentioned shape after the bumper fascia. Moreover, the extension in the first extension direction is preferably chosen to be large enough to compensate for different geometries of different bumper fasciae.

In the third direction, the extension of the air guide seal arrangement, and hence of the first member as well, is chosen to fit the size of the portion of the cooler, to which air is to be guided.

The present invention also relates to a first kit including the bumper fascia and the first member of the air guide seal arrangement as described herein, the first member being attached to the inner surface bumper fascia, such that the first edge portion of the first member seals against the inner surface of the bumper fascia. The first kit may be manufactured at a subcontractor and brought to a vehicle assembly plant as a whole kit.

The present invention also relates to a second kit including the cooler and the second member of the air guide seal arrangement as described herein, the second member being attached to the forwards-facing surface of the cooler, such that the second edge portion of the second member seals against the forwards-facing surface of the cooler. The second kit may be manufactured at a subcontractor and brought to the vehicle assembly plant as a whole kit.

The present invention also relates to a front portion of a vehicle, the front portion including a bumper fascia, a cooler and an air guide seal arrangement as described herein, wherein the air guide seal arrangement is located between the bumper fascia and the cooler. The first member and the second member are pressed together in use, i.e. when mounted in the vehicle. The first edge portion of the first member is shaped to seal against the inner surface of the bumper fascia. The second edge portion of the first member and/or the first edge portion of the second member form the seal between the first member and the second member by means of the resiliency. The second edge portion of the second member is shaped to seal against the forwards-facing surface of the cooler.

At least one of the second edge portion of the first member and the first edge portion of the second member may be tensioned, when the first member and the second member are pressed together. It may then remain tensioned after it has been mounted in the vehicle, i.e. it is tensioned when located in the vehicle. If compared to an untensioned state, at least one the first member and/or the second member are thereby pushed back by a distance larger than 0, e.g. at least 0.2 cm, at least 0.5 cm or at least 1 cm.

The first member and the second member may partly overlap each other, e.g. by at least 0.2 cm, at least 0.5 cm or at least 1 cm, when the first member and the second member are pressed together.

In the front portion, the first member may have an extension in the lateral direction of the vehicle being at least 1 cm, preferably at least 3 cm, more preferably at least 5 cm.

The present invention also relates to a vehicle including the front portion according to the invention.

The present invention also relates to a method of assembling a front portion according to the invention. The method includes:
a) attaching the first member to the bumper fascia, such that the first edge portion of the first member seals against the inner surface of the bumper fascia,
b) attaching the second member to the cooler, such that the second edge portion of the second member seals against the cooler,
c) bringing the bumper fascia, with the first member attached to it, towards the cooler, thereby pressing the second edge portion of the first member against the second member and/or pressing the first edge portion of the second member against the first member, thereby providing the seal between the first member and the second member, and
d) securing the bumper fascia relative to the cooler, so as to maintain pressure between the first and second members.

By utilizing the method according to the invention, the assembly of the front portion is quick and easy. Further advantages are mentioned above when describing the air guide seal arrangement according to the invention.

One first member may be attached to the bumper fascia at a respective position corresponding to each lateral side of the cooler, when assembled in the vehicle. The two first members may then be mirror images of each other, e.g. if the bumper fascia is mirror symmetric, or they may have different shapes. As an alternative, only one first member may be used at one of the lateral sides of the cooler. As yet an alternative, the first member may have a size corresponding to the size of the portion of the cooler, to which air is to be guided. In that case, the first member may form a closed circumference. Further, the first member may have any of the shapes mentioned above. In step a), the first kit described herein, including the bumper fascia and at least one attached first member, may be provided.

In step b), the second kit including the cooler and the attached second member may be provided. The second edge portion may form a closed circumference in contact with the cooler at a lower portion of the cooler. Further, the second member may have any of the shapes mentioned above.

Steps a) and b) may be made in parallel or in sequence. They may for example be performed at a respective subcontractor or in the vehicle assembly plant. Steps c) and d) are typically performed at the vehicle assembly plant.

BRIEF DESCRIPTION OF THE DRAWINGS

The present invention will hereinafter be further explained by means of non-limiting examples with reference to the appended drawings wherein:

FIG. 11 illustrates a first member of an air guide seal arrangement according to a third embodiment of the invention.

It should be noted that the appended drawings are schematic and that individual members are not necessarily drawn to scale and that the dimensions of some features of the present invention may have been exaggerated for the sake of clarity.

DESCRIPTION OF EMBODIMENTS

The invention will, in the following, be exemplified by embodiments. It should however be realized that the embodiments are included in order to explain principles of the invention and not to limit the scope of the invention, as defined by the appended claims. A feature from one embodiment may be combined with one or more features of any other embodiment.

Figure 2:
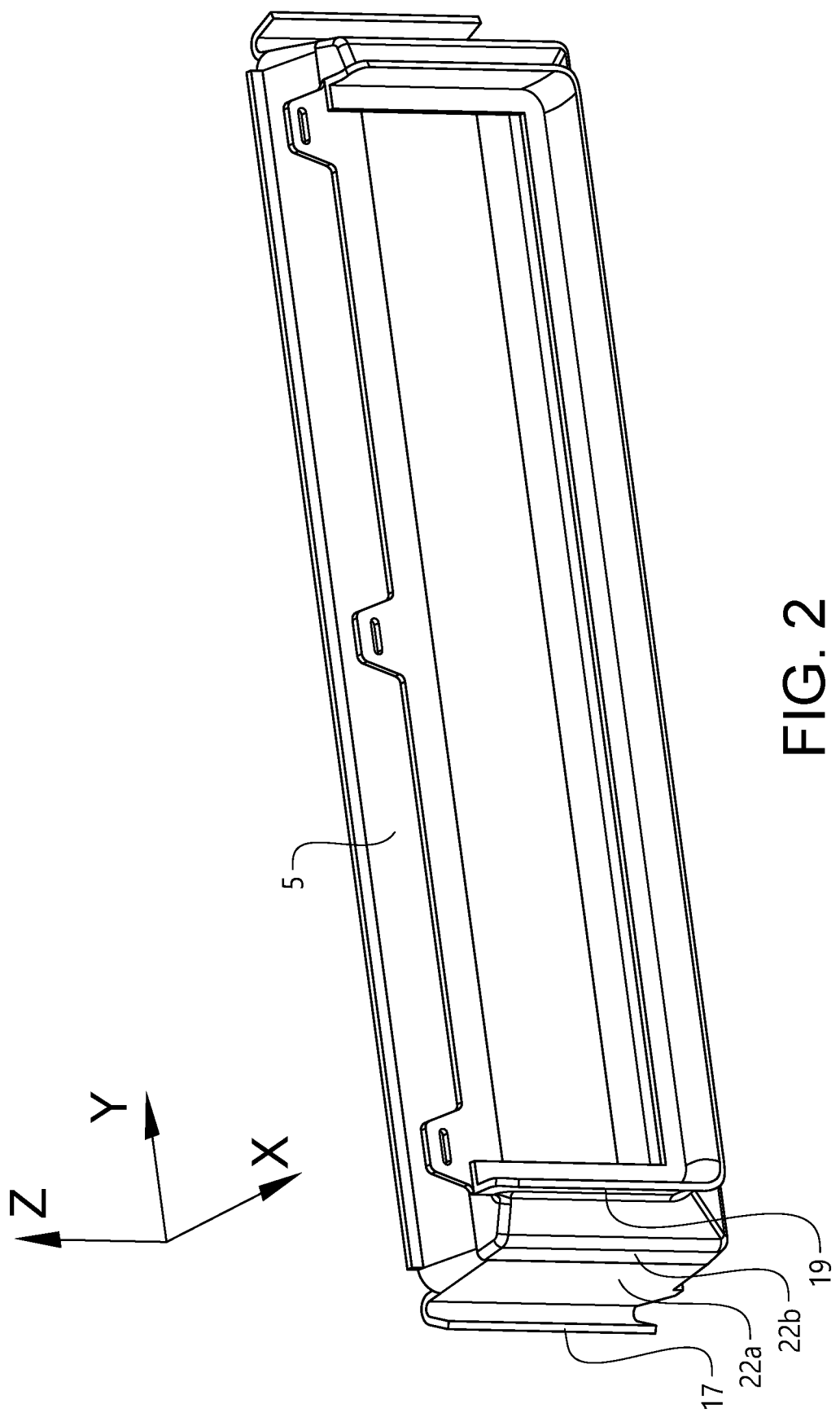
FIG. 2 illustrates a second member of the air guide seal arrangement.
Figure 3:
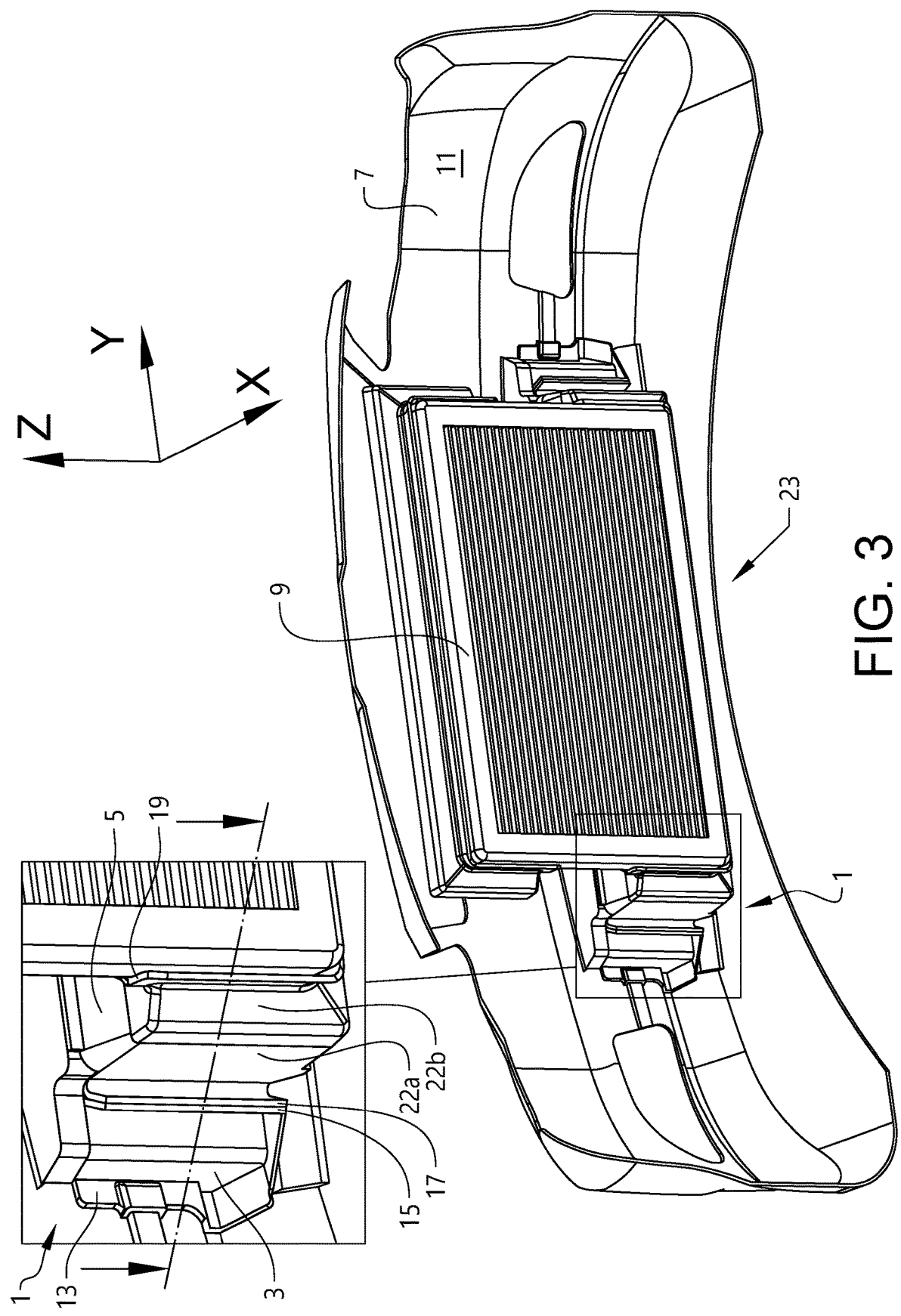
FIG. 3 illustrates the air guide seal arrangement mounted between the bumper fascia and a cooler.
Figure 4:
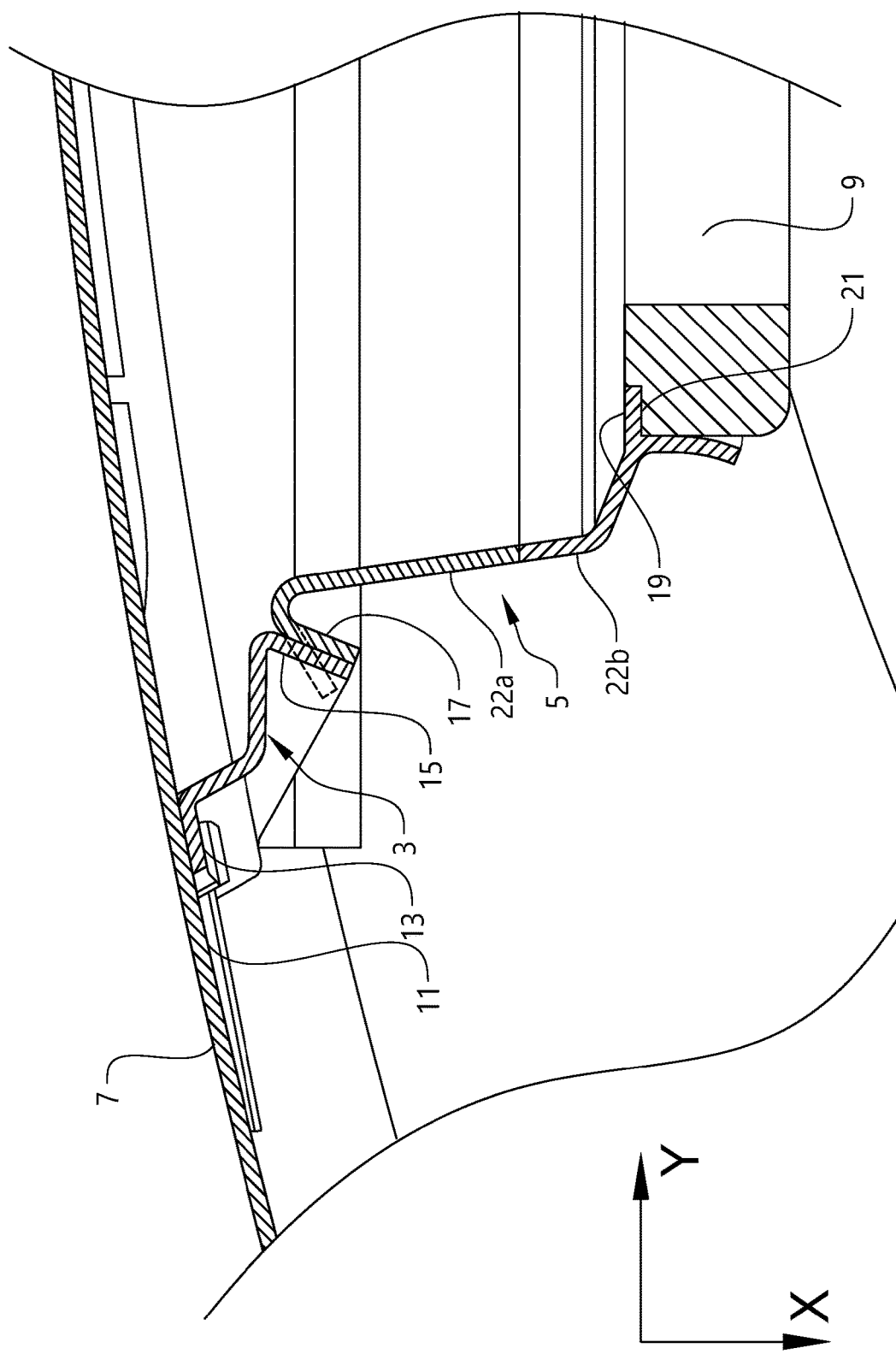
FIG. 4 is a cross-section through the air guide seal arrangement of FIG. 3.

FIGS. 1-4 illustrate an air guide seal arrangement 1 according to a first embodiment of the invention. The air guide seal arrangement 1 includes a first member 3, illustrated in FIG. 1, and a second member 5, illustrated in FIG. 2. The air guide seal arrangement 1 is located between a bumper fascia 7 and a cooler 9 in a front portion 23 of a vehicle, illustrated in FIG. 3. FIG. 4 illustrates a cross-section through the air guide seal arrangement, see point-dashed line in FIG. 3.

The bumper fascia 7 has an outer surface and an inner surface 11, wherein the inner surface 11 faces the cooler 9 when mounted in the vehicle. The vehicle has a longitudinal direction X, a lateral direction Y and a vertical direction Z, the directions X, Y, Z being perpendicular to each other. These directions X, Y, Z correspond to first, second and third extension directions of the first member 3 and the second member 5 of the air guide seal arrangement 1.

Figure 1:
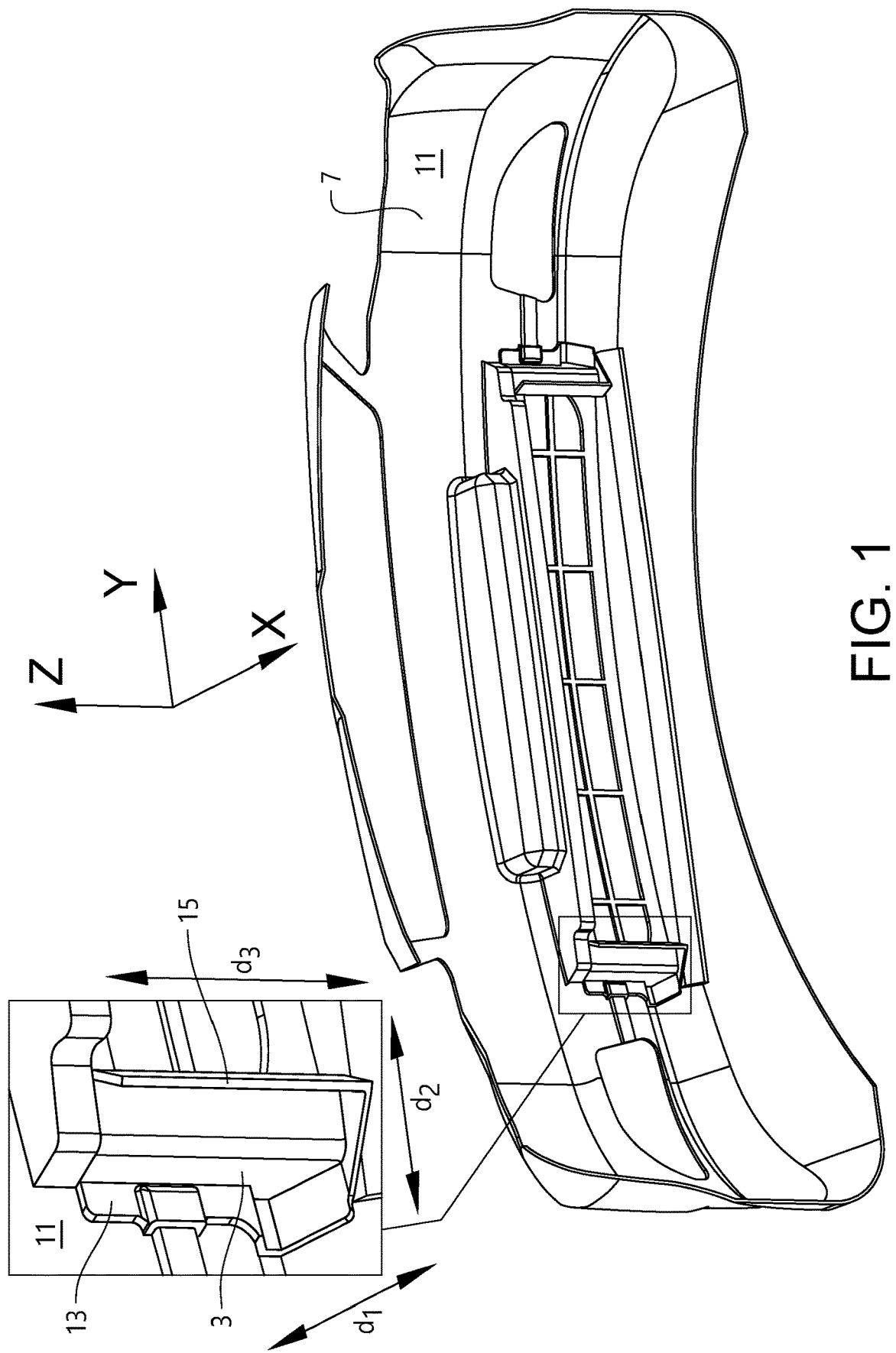
FIG. 1 illustrates a first member of an air guide seal arrangement according to a first embodiment of the invention when mounted to a bumper fascia.

As is best seen in the detailed view of FIG. 1, the first member 3 has a first irregularly shaped edge portion 13 shaped to seal against the inner surface 11 of the bumper fascia 7. Hence, the first edge portion 13 is shaped after the inner surface 11 of the bumper fascia 7. The first member 3 further has a second regularly shaped edge portion 15, which is at the opposite side of the first edge portion 13 of the first member 3, as seen in the longitudinal direction X of the vehicle. In the illustrated embodiment, the second edge portion 15 forms a straight edge extending in the vertical direction Z of the vehicle, i.e. in the third extension direction of the first member 3.

In the illustrated embodiment, there is a respective first member 3 located at the bumper fascia 7 at locations corresponding to each lateral side of the cooler 9. The two first members 3 may form mirror images of each other, as is illustrated, or they may be individually shaped to fit to the inner surface 11 of the bumper fascia 7.

The first member 3 extends in all three extension directions. The first member 3 has a first extension $d_1$ in the first extension direction, a second extension $d_2$ in the second extension direction n and a third extension $d_3$ in the third extension direction. Typically, the second extension $d_2$, i.e. in the lateral direction Y of the vehicle, is at least 1 cm, preferably at least 3 cm, more preferably at least 5 cm. This differs from some prior art air guide seal arrangements, which substantially only extends in the longitudinal and vertical directions of the vehicle, i.e. having a second extension $d_2$ in the lateral direction Y of the vehicle being less than 1 cm.

The first extension $d_1$ is selected to be large enough to provide the above-mentioned shape according to the inner surface 11 of the bumper fascia 7 and thus to compensate for irregularities of that shape. Moreover, the extension $d_1$ in the first extension direction of the first member 3 is preferably chosen to be large enough to compensate for different geometries of different bumper fasciae, as is further exemplified below.

The third extension of the air guide seal arrangement 1, and hence of the third extension $d_3$ of the first member as well, is chosen to fit the size of the portion of the cooler 9, to which air is to be guided, in the illustrated embodiment, a lower portion.

At least 70%, more preferably at least 90%, more preferably at least 95% and more preferably 100%, as is illustrated, of the first member 3 includes a first material, typically plastics, e.g. injection moulded plastics.

Figure 8:
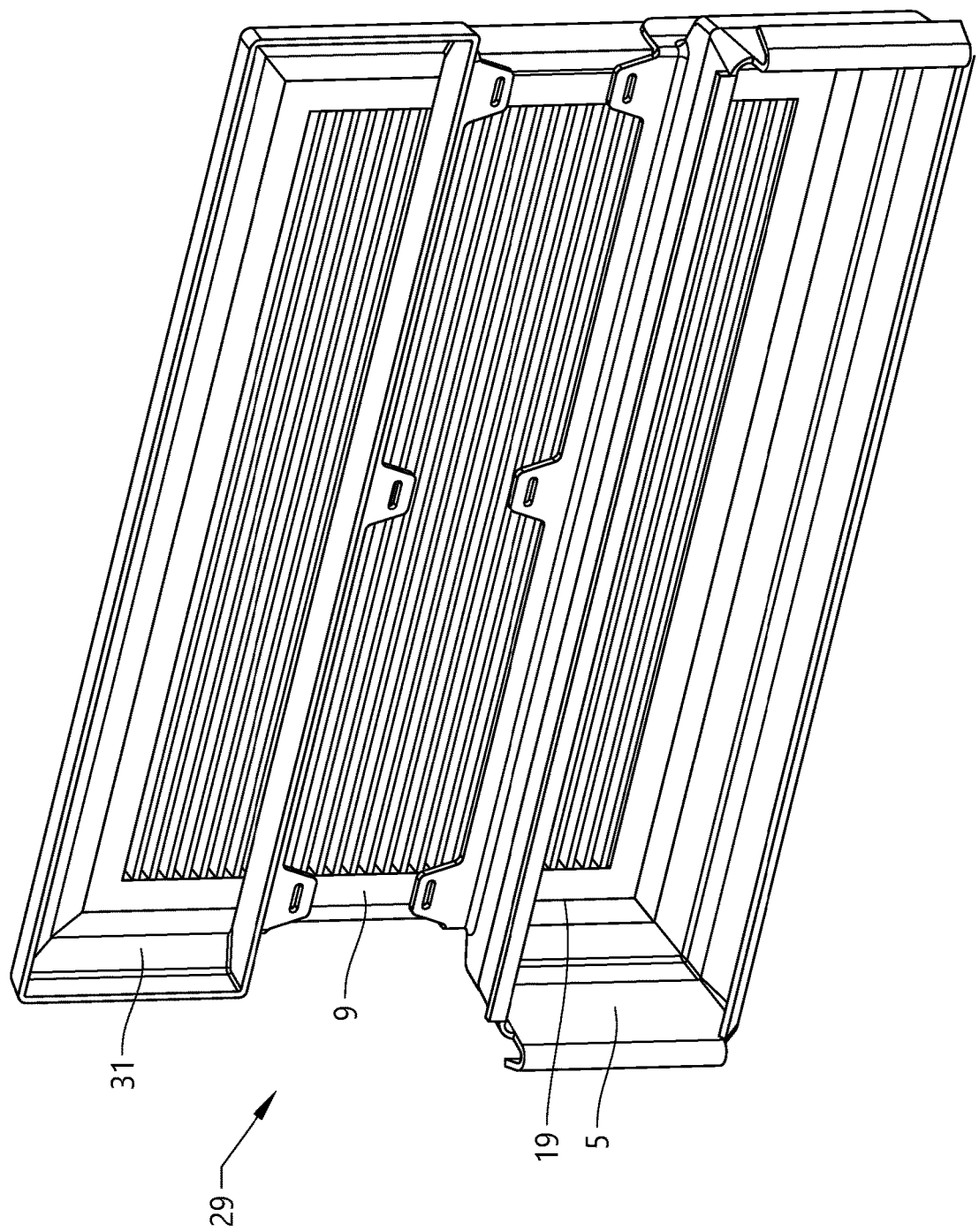
FIG. 8 illustrates the second member of FIG. 2 mounted to the cooler.

As is best seen in FIG. 2, the second member 5 has a first edge portion 17, which is regularly shaped, and a second edge portion 19, being located opposite to the first edge portion 17 as seen in the longitudinal direction X of the vehicle. The second edge portion 19 is shaped to seal against a forwards-facing surface 21 of the cooler 9 and may thus have an irregular shape, which is adapted to the cooler 9. In the illustrated embodiment, the second edge portion 19 forms a closed circumference in contact with the lower portion of the cooler 9, as is best seen in FIG. 8. Alternatively, two or more second members may be arranged in sealing contact with the cooler 9 and the respective first members 3.

In the illustrated embodiment, the first edge portion 17 of the second member 5 forms a straight edge extending in the vertical direction Z, in parallel to the second edge portion 15 of the first member 3, hence extending in the third extension direction. Another part of the first edge portion 17 of the second member 5 extends in the lateral direction Y. Further, in the illustrated embodiment, the second member 5 includes a resilient lip 22a, with the first edge portion 17 being included in the resilient lip 22a. The resilient lip 22a is preferably made of a thermoplastic elastomer or rubber. The remaining portion 22b of the second member 5 may include another material, typically plastics, e.g. injection moulded plastics. This may be seen in FIG. 4, wherein different cross-section markings are used for the resilient lip 22a and the remaining portion 22b, respectively.

At least one of the first member 3 and the second member 5 is resilient, possibly both. The resiliency may be provided by the shape of the edge portions 15, 17 of the first member 3 and/or the second member 5, or by the shape of the first member 3 and/or the second member 5 as a whole. As an alternative or a complement, the resiliency may be provided by the material properties of the edge portions 15, 17 of the first member 3 and/or the second member 5 or of the first member 3 and/or the second member 5 as a whole. In the illustrated embodiment, the resiliency is mainly provided by the resilient lip 22a of the second member 5.

The first member 3 and the second member 5 form two separate members, i.e. they are not attached to each other by any connection means such as a hinge, a snap-fit connection or by any attachment means, such as an adhesive, a rivet or a bolt. Instead, the first member 3 and the second member 5 are adapted to be held together solely by being pressed together when mounted in the vehicle, as is illustrated in FIGS. 3 and 4. When pressed together, the second edge portion 15 of the first member 3 and/or the first edge portion 17 of the second member 5 form a seal between the first member 3 and the second member 5 by means of the resiliency. The second member 5 abuts the first member 3 and is thereby tensioned.

In the illustrated embodiments, the first member 3 and the second member 5 abut each other by overlapping edge portions 15, 17, as is best seen in FIG. 4. However, it would also be feasible that the second edge portion 15 of the first member 3 abuts the second member 5 at another location than the first edge portion 17 or that the first edge portion 17 of the second member 5 abuts the first member 3 at another location than the second edge portion 15.

When mounted in the vehicle, as illustrated in FIGS. 3-4, the second edge portion 15 of the first member 3 and/or the first edge portion 17 of the second member 5 are tensioned, thereby providing the seal between the first member 3 and the second member 5. This may best be gleaned in FIG. 4, wherein dashed lines indicate a theoretical untensioned position of the first edge portion 17 of the second member 5, if not abutting the first member 3 and thereby being tensioned.

Figure 5:
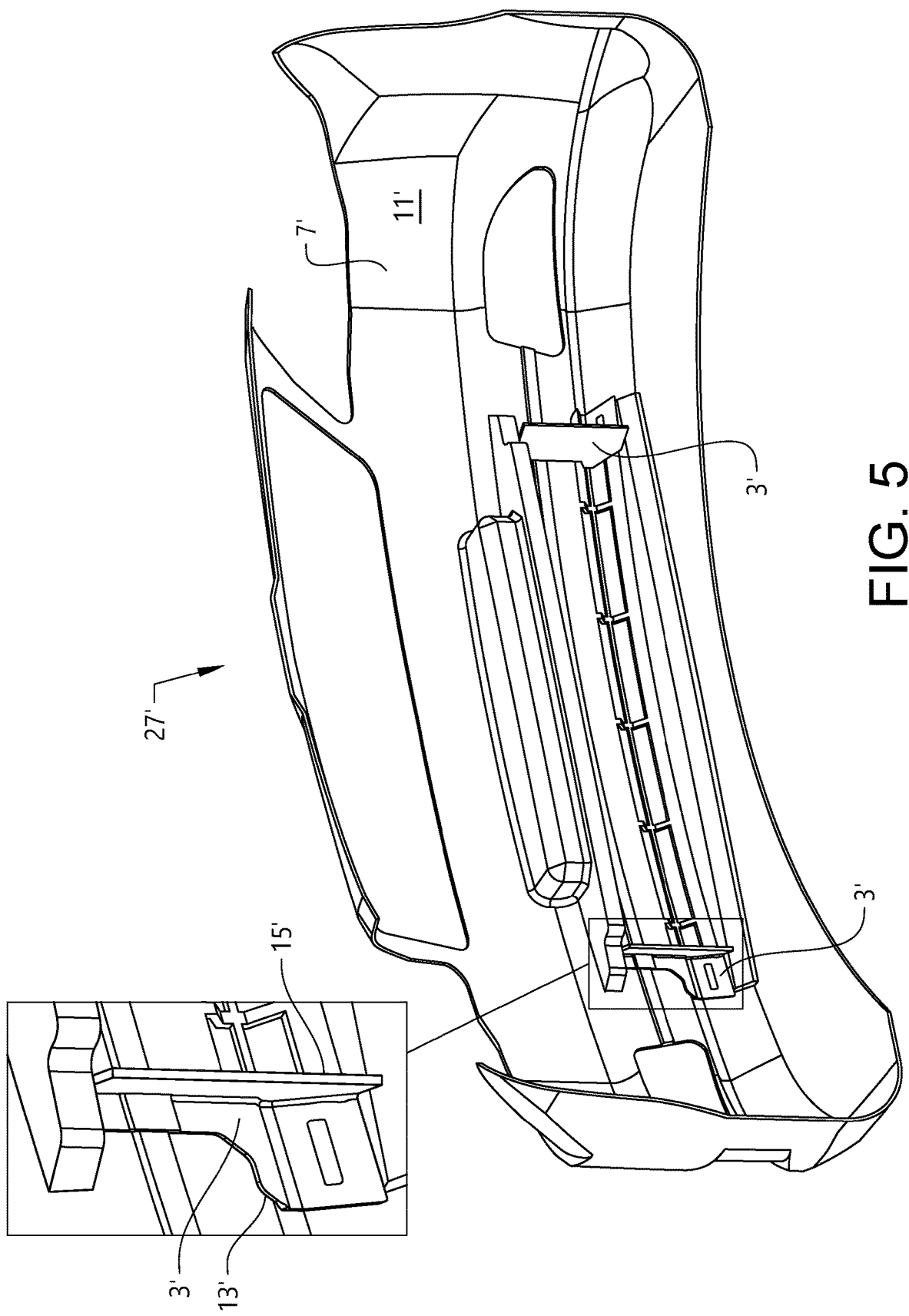
FIG. 5 illustrates a first member of an air guide seal arrangement according to a second embodiment of the invention when mounted to another bumper fascia.

FIG. 5 illustrates another first member 3' of an air guide seal arrangement 1' according to a second embodiment of the invention, whereof only the first members 3' are shown in FIG. 5 when mounted to an inner surface 11' of another bumper fascia 7'. Since the inner surface 11' of the bumper fascia 7' of FIG. 5 is different to that of the bumper fascia 7 of FIGS. 1-4, the first member 3' of FIG. 5 has another shape than that of FIG. 1. Their respective first edge portions 13, 13' are adapted to their respective inner surfaces 11, 11'. Yet, they may have correspondingly shaped second edge profiles 15, 15', such that both the first member 3 of the first embodiment and the first member 3' of the second embodiment would provide a seal when abutting a second member 5 like the one illustrated in FIG. 2.

This makes it possible to provide the air guide seal arrangements 1, 1' as a modular system, wherein a plurality of different first members 3', 3' will fit together with a single variant of the second member 5. Accordingly, when changing the bumper fascia 7, 7' to another kind, only the first member 3, 3' will be exchanged, while it is possible to continue using the same kind of second member 5 and the same kind of cooler 9. This is not only work-saving, but also beneficial from a financial point of view, since the first member 3, 3' in the air guide seal arrangement 1, 1' according to the invention is less expensive to manufacture than the more complicated second member 5. This is also financially beneficial when compared to prior art air guide seal arrangements, in which there only is a single component filling the function of the combination of the first members 3', 3' and the second member 5 according to the invention, since in that case, that single component has to be exchanged when changing the kind of bumper fascia.

FIGS. 6-10 disclose a method according to the invention of assembling a front portion 23 of a vehicle 25. The front portion 23 includes a bumper fascia 7', a cooler 9 and an air guide seal arrangement 1' according to the invention. In FIGS. 6-10, the first member 3' and the bumper fascia 7' of FIG. 5 are used as examples, but the method is applicable for various kinds of air guide seal arrangements according to the invention when assembled together with different kinds of bumper fasciae 7, 7', e.g. the air guide seal arrangement 1 disclosed in FIGS. 1-4 or in FIG. 11.

Figure 6:
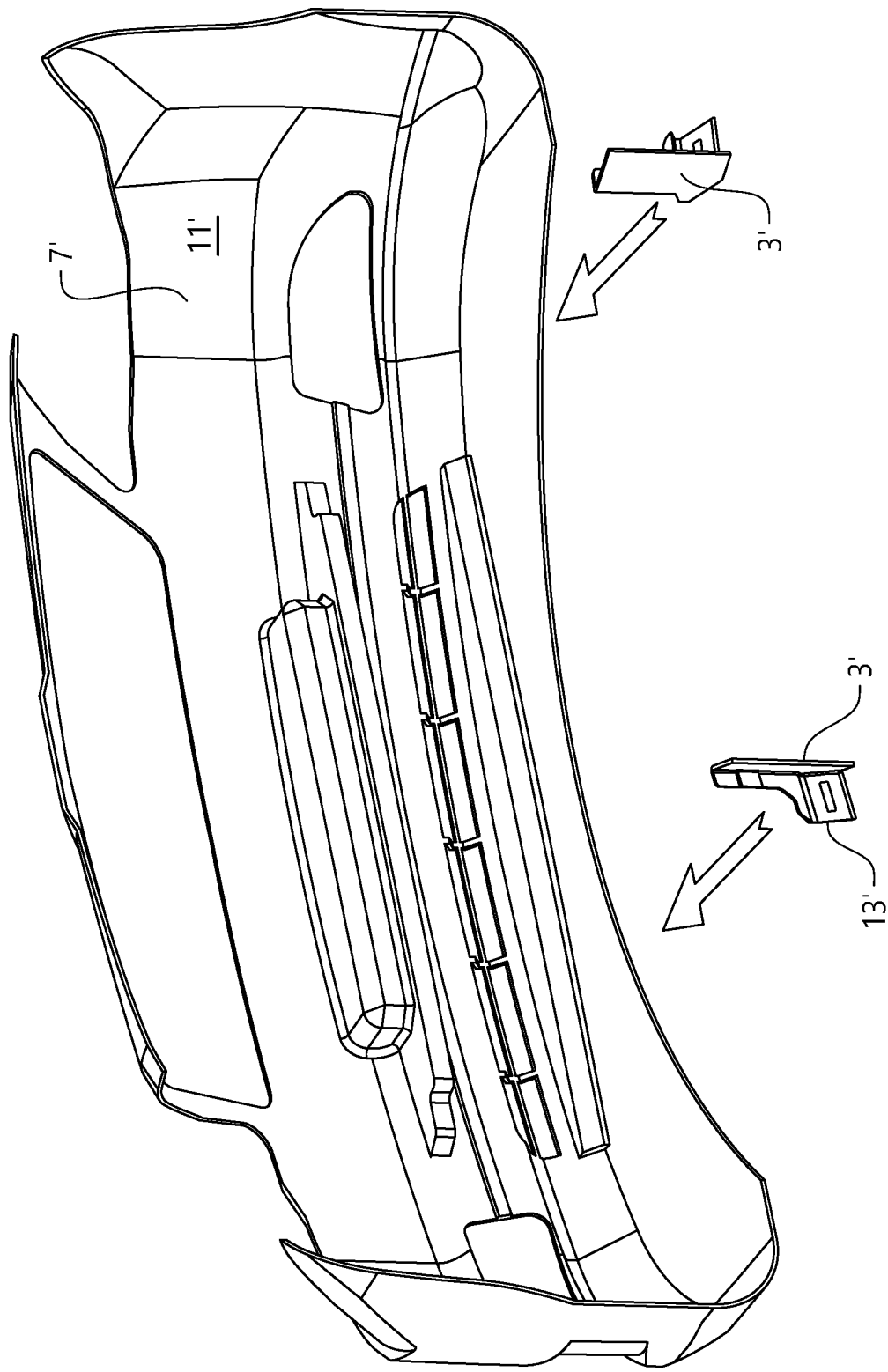
FIG. 6 illustrates mounting of the first member of FIG. 5 to the other bumper fascia.

The method includes attaching the first member 3' to the bumper fascia 7', such that the first edge portion 13' of the first member 3' seals against the inner surface 11' of the bumper fascia 7', see FIG. 6.

In the illustrated embodiment, there is one first member 3' attached at a respective position corresponding to each lateral side of the cooler 9, when assembled in the vehicle. The first members 3' may be mirror images of each other as is illustrated, e.g. if the bumper fascia 7' is mirror symmetric, or they may have different shapes.

Thereby, a first kit 27' including the bumper fascia 7' and at least one attached first member 3', in the illustrated embodiment two first members 3', is provided, see FIG. 5.

Correspondingly, another first kit could be provided by attaching the first member 3 of FIG. 1 with the bumper fascia 7 of FIG. 3.

Figure 7:
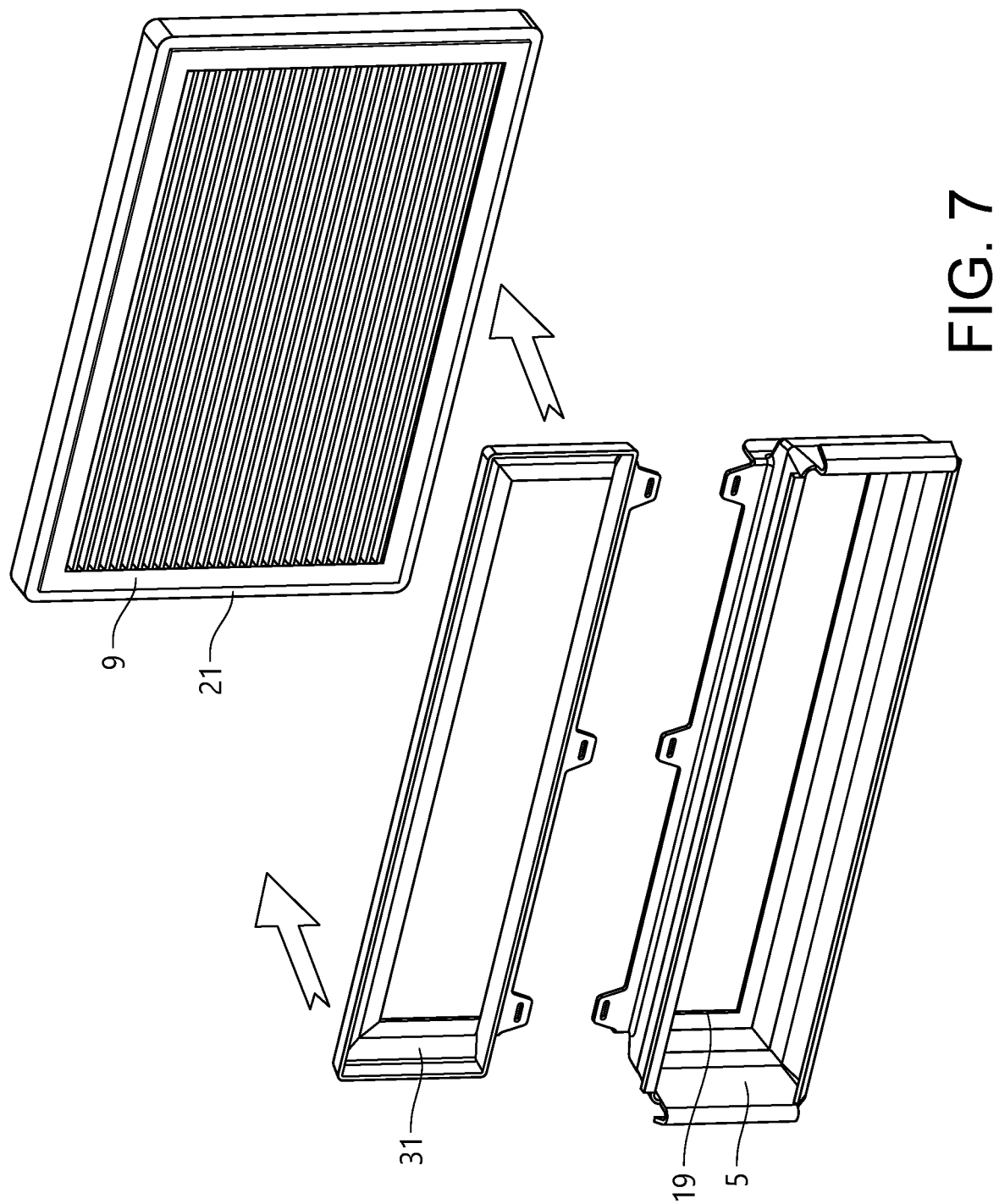
FIG. 7 illustrates mounting of the second member of FIG. 2 to the cooler.

The method also includes attaching the second member 5 to the cooler 9, such that the second edge portion 19 of the second member 5 seals against forwards-facing surface 21 of the cooler 9, see FIGS. 7 and 8.

In the illustrated embodiment, the second edge portion 19 forms a closed circumference in contact with the cooler 9 at the lower portion of the cooler 9. Thereby a second kit 29 including the cooler 9 and the attached second member 5 is provided.

In the illustrated embodiment, there is also an upper air guide 31 arranged in contact with the cooler 9. The upper air guide 31, being optional, is intended to guide air from an upper opening of the bumper fascia 7' to an upper portion of the cooler 9.

These two steps may be made in parallel or in sequence. They may for example be performed at a respective sub-contractor or in a vehicle assembly plant.

Figure 9:
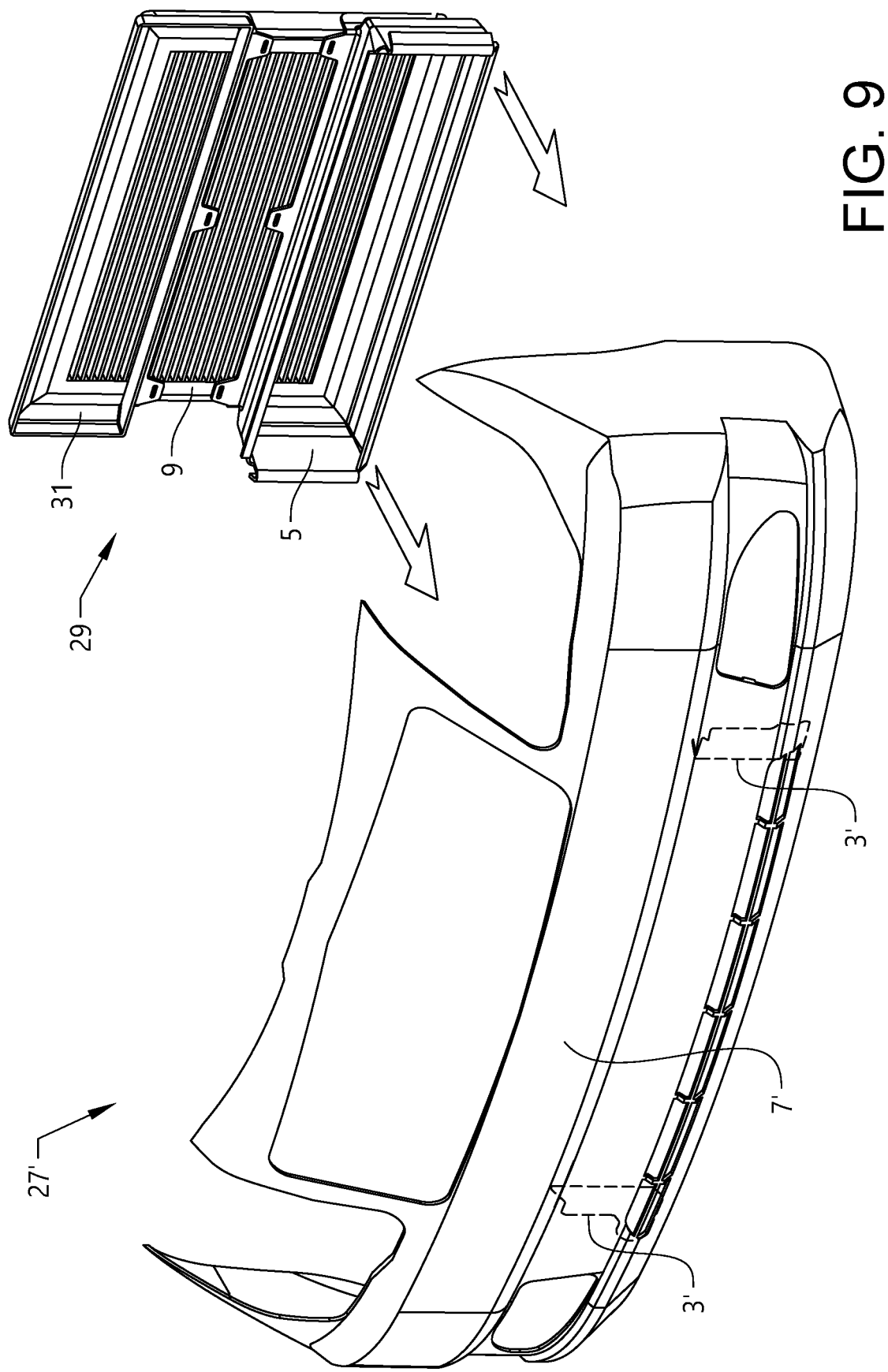
FIG. 9 illustrates assembling of a front portion according to the invention.
Figure 10:
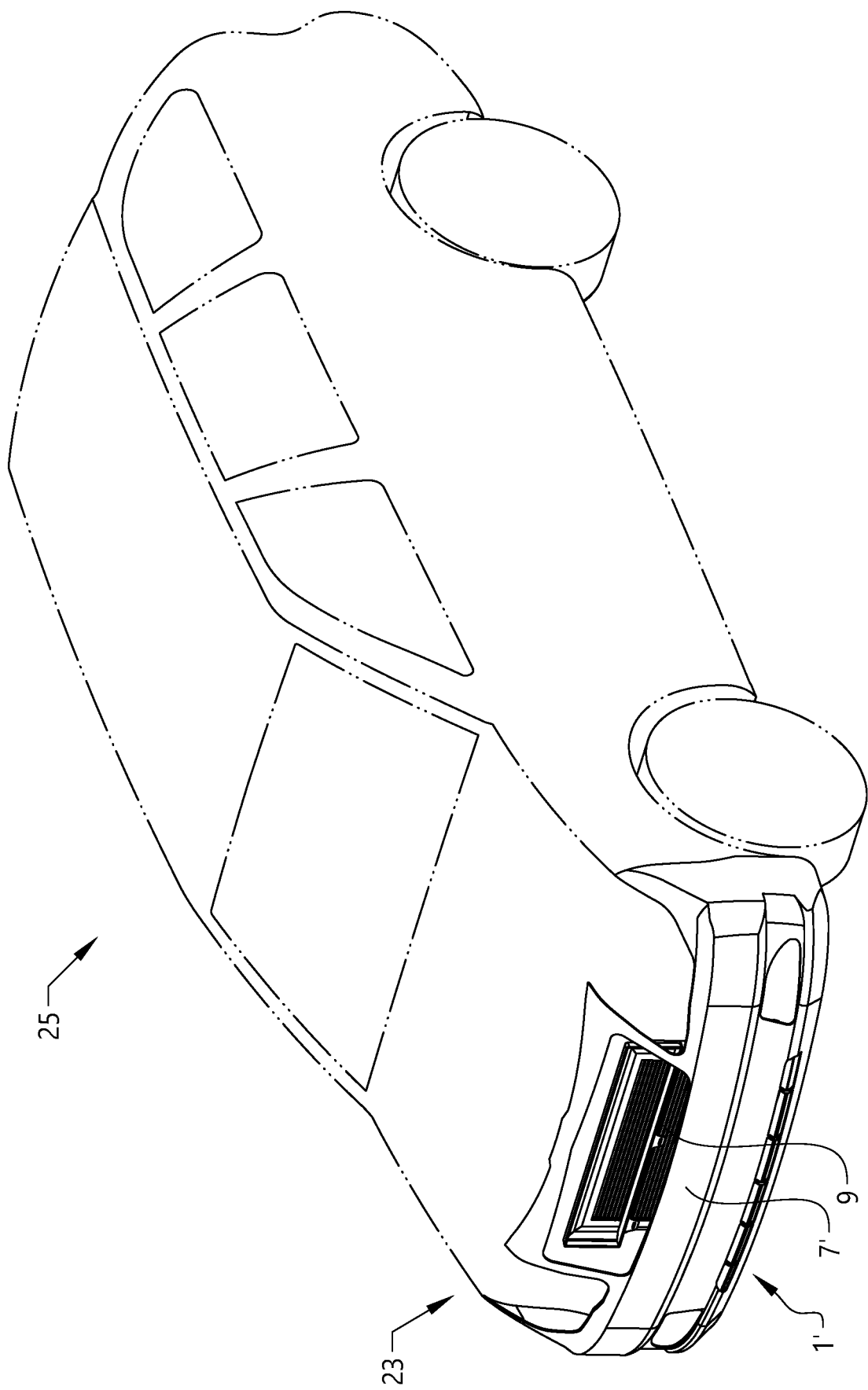
FIG. 10 illustrates a vehicle with the front portion of FIG. 9.

The method further includes bringing the bumper fascia 7', with the first member 3' attached to it, i.e. the first kit 27', towards the cooler 9, thereby pressing the second edge portion 15' of the first member 3' against the second member 5 and/or pressing the first edge portion 17 of the second member 5 against the first member 3', thereby providing the seal between the first member 3' and the second member 5, see FIG. 9, and securing the bumper fascia 7' relative to the cooler 9, so as to maintain pressure between the first and second members 3', 5, see FIG. 10.

By utilizing an air guide seal arrangement 1, 1' according to the invention, the assembly of the front portion 23 is easy and quick.

FIG. 11 illustrates yet another first member 3" of an air guide seal arrangement according to a third embodiment of the invention, whereof only the first member 3" is shown in FIG. 11. The first member 3" is shaped such that it surrounds a lower opening in the bumper fascia 7'. Hence, the first member 3" of this embodiment has a closed circumference. Such a first member 3" would fit together with the second member 5 described above. In the illustrated embodiment of FIG. 11, the second edge portion of the first member forms a straight edge extending in the vertical and lateral directions Z, Y of the vehicle.

Further modifications of the invention within the scope of the appended claims are feasible. As such, the present invention should not be considered as limited by the embodiments and figures described herein. Rather, the full scope of the invention should be determined by the appended claims, with reference to the description and drawings.

The invention claimed is:

1. An air guide seal arrangement adapted to be located between a bumper fascia and a cooler of a vehicle, said bumper fascia having an outer surface and an inner surface, said inner surface facing said cooler when mounted in said vehicle, said air guide seal arrangement comprising: a first member and a second member, said first member having a first irregularly shaped edge portion, shaped to conform with and seal against said inner surface of said bumper fascia, and a second regularly shaped edge portion being located opposite to said first edge portion, said second member having a first regularly shaped edge portion and a second edge portion, being located opposite to said first edge portion, shaped to seal against a forwards-facing surface of said cooler, wherein at least one of said first member and said second member is resilient, said first member and said second member form two separate members both extending in a vertical direction (Z) of said vehicle and partially in a longitudinal direction (X) and a lateral direction (Y) of said vehicle and adapted to be held together, with a portion of said first edge portion of said second member extending partially in said lateral direction (Y) and disposed inside and displaced in said lateral (Y) direction by said second edge portion of said first member extending partially in said lateral direction (Y), solely by being pressed together in use, said second edge portion of said first member and said first edge portion of said second member being shaped to thereby form a seal between said first member and said second member by means of said resiliency, said second edge portion of said first member being disposed parallel to and contacting said first edge portion of said second member along said lateral direction (Y) of said vehicle.

2. The air guide seal arrangement according to claim 1, wherein at least one of said second edge portion of said first member and said first edge portion of said second member has a straight shape.

3. The air guide seal arrangement according to claim 1, wherein at least 70% of said first member comprises a first material.

4. The air guide seal arrangement according to claim 3, wherein said first material is plastic.

5. The air guide seal arrangement according to claim 1, wherein said second member comprises a resilient lip, said first edge portion being comprised in said resilient lip, said resilient lip being made of a thermoplastic elastomer or rubber.

6. The air guide seal arrangement according to claim 1, wherein said first member extends in three extension directions, a first extension direction corresponding to said longitudinal direction (X) of said vehicle, a second extension direction corresponding to said lateral direction (Y) of said vehicle, a third extension direction corresponding to said vertical direction (Z) of said vehicle, said extension directions being perpendicular to each other, wherein said first member has an extension (d2) in the second extension direction being at least 1 cm.

7. A kit comprising said bumper fascia and said first member of said air guide seal arrangement according to claim 1, said first member being attached to said inner surface of said bumper fascia, such that said first edge portion of said first member seals against said inner surface of said bumper fascia.

8. A kit comprising said cooler and said second member of said air guide seal arrangement according to claim 1, said second member being attached to said forwards-facing surface of said cooler, such that said second edge portion of said second member seals against said forwards-facing surface of said cooler.

9. A front portion of a vehicle, said front portion comprising said bumper fascia, said cooler and said air guide seal arrangement according to claim 1, wherein said air guide seal arrangement is located between said bumper fascia and said cooler, said first member and said second member being pressed together in use, said first edge portion of said first member being shaped to seal against said inner surface of said bumper fascia, said second edge portion of said first member and said first edge portion of said second member forming said seal between said first member and said second member by means of said resiliency, and said second edge portion of said second member being shaped to seal against said forwards-facing surface of said cooler.

10. The front portion according to claim 9, wherein at least one of said second edge portion of said first member and said first edge portion of said second member is tensioned, when said first member and said second member are pressed together.

11. The front portion according to claim 9, wherein said first member and said second member partly overlap each other by at least 0.2 cm when said first member and said second member are pressed together.

12. The front portion according to 9, when comprising an air guide seal arrangement according to claim 6, wherein said first member has an extension (d2) in said lateral direction (Y) of said vehicle being at least 1 cm.

13. A vehicle comprising said front portion according to claim 9.

14. A method of assembling a front portion according to claim 9, said method comprising:
    a) attaching said first member to said bumper fascia, such that said first edge portion of said first member seals against said inner surface of said bumper fascia,
    b) attaching said second member to said cooler, such that said second edge portion of said second member seals against said cooler,
    c) bringing said bumper fascia, with said first member attached to it, towards said cooler, thereby pressing said second edge portion of said first member against said second member and/or pressing said first edge portion of said second member against said first member, thereby providing said seal between said first member and said second member, and
    d) securing said bumper fascia relative to said cooler, so as to maintain pressure between said first and second members.

15. An air guide seal arrangement adapted to be located between a bumper fascia and a cooler of a vehicle, said bumper fascia having an outer surface and an inner surface, said inner surface facing said cooler when mounted in said vehicle, said air guide seal arrangement comprising: a first member and a second member, said first member having a first irregularly shaped edge portion, shaped to conform with and seal against said inner surface of said bumper fascia, and a second regularly shaped edge portion being located opposite to said first edge portion, said second member having a first regularly shaped edge portion and a second edge portion, being located opposite to said first edge portion, shaped to seal against a forwards-facing surface of said cooler, wherein at least one of said first member and said second member is resilient, said first member and said second member form two separate members adapted to be held together solely by being pressed together in use, said second edge portion of said first member and said first edge portion of said second member being shaped to thereby form a seal between said first member and said second member by means of said resiliency, wherein said second edge portion of said first member extends in a vertical direction (Z) and partially in a longitudinal direction (X) and lateral direction (Y) of said vehicle and said first edge portion of said second member extends in said vertical direction (Z) and partially in said longitudinal direction (X) and lateral direction (Y) of said vehicle, said second edge portion of said first member being disposed parallel to and contacting said first edge portion of said second member along said longitudinal direction (X) and said lateral direction (Y) of said vehicle with said second edge portion of said first member displacing a portion of said first edge portion of said second member in said lateral direction (Y).

16. The air guide seal arrangement according to claim 15, wherein at least one of said second edge portion of said first member and said first edge portion of said second member has a straight shape.

17. The air guide seal arrangement according to claim 15, wherein at least 70% of said first member comprises a first material.

18. The air guide seal arrangement according to claim 17, wherein said first material is plastic.

19. The air guide seal arrangement according to claim 15, wherein said second member comprises a resilient lip, said first edge portion being comprised in said resilient lip, said resilient lip being made of a thermoplastic elastomer or rubber.

20. The air guide seal arrangement according to claim 15, wherein said first member extends in three extension directions, a first extension direction corresponding to a longitudinal direction (X) of said vehicle, a second extension direction corresponding to said lateral direction (Y) of said vehicle, a third extension direction corresponding to a vertical direction (Z) of said vehicle, said extension directions being perpendicular to each other, wherein said first member has an extension (d2) in the second extension direction being at least 1 cm.

* * * * *